United States Patent Office 2,776,273
Patented Jan. 1, 1957

2,776,273

COPOLYMERIZATION OF VINYL CHLORIDE AND VINYLIDENE CHLORIDE WITH MIXED AZO-INORGANIC PEROXIDE CATALYST

Antoine P. Richard, Villeurbanne, France, assignor to Societe Anonyme des Manufactures des Glaces et Produits Chimiques de Saint-Gobain, Chauny & Cirey, Paris, France No Drawing. Application June 2, 1952,
Serial No. 291,335

Claims priority, application France June 4, 1951

9 Claims. (Cl. 260—87.7)

This invention relates to the copolymerization of vinyl chloride and vinylidine chloride.

Many difficulties are met with when trying to obtain, from these monomers, satisfactory copolymers containing about from 10 to 30% vinylidine chloride.

If bulk copolymerization is effected, a horny product is obtained, the ulterior working of which is difficult. It seems to result from the fact that the copolymer is soluble in the mixture of monomers.

If the copolymerization is effected in the presence of a solvent of the monomers which is not a solvent of the copolymer, the material obtained is a sufficiently fine powder but the yields of copolymerization are not greater than 70%. Moreover, the speed of copolymerization is low and this process tends to yield short chain polymers, which is harmful to the quality of the resin.

If the copolymerization is effected in emulsion the results are slightly improved, but the speed of polymerization remains very low (hourly yield of about 2%) and yields of 90–100%, can only be obtained through polymerization for periods of time hardly compatible with a commercial working of the process.

Besides, it must be noted that, whatever the polymerizing process may be, nonhomogeneous resins are obtained. This is due to the fact that the polymerization speed of vinyl chloride is lower than that of vinylidine chloride, so that, during the copolymerization, the mixture of monomers becomes poorer in vinylidine chloride and that, at the end, the product obtained is constituted by mixtures of copolymers of different molecular weights and compositions.

An object of this invention is to produce homogeneous and long chain copolymers of vinyl chloride and vinylidine chloride. Another object of this invention is to reach a polymerization speed sufficient for a commercial working of the process.

The process of this invention consists in effecting the copolymerization of vinyl chloride and of vinylidine chloride in aqueous emulsion in the presence of a mixture of two catalysts, one of which is an azo-compound and the other is a peroxidized mineral catalyst.

Examples of azocatalysts are: azo-diisobutyronitrile, methyl azo-diisobutyrate, azo-bis(phenylpropionitrile).

Examples of peroxidized mineral catalysts are: hydrogen peroxide, perborates, and persulfates, particularly ammonium persulfate.

By using this mixture of two catalysts, the induction period of the copolymerization is shortened and the hourly yield reaches about 5%, which attains a total polymerization in less than 24 hours.

Moreover, the latex so obtained is stable and the resin, after flocculation and washing, appears as a white powder of homogeneous composition and remarkable properties.

The invention may be practically worked out as follows: the emulsifier (such as sodium alkylsulfonate, the pH of which is maintained at 7 by using a buffer substance), the catalysts and the vinylidine chloride are introduced in a stainless steel stirring autoclave. After closing the autoclave, the air is removed by blowing with nitrogen, and vinyl chloride under pressure is introduced. The volumes of the organic and aqueous phases are about equal. The ideal temperature is about 40°/50° C.

The following examples show how the present invention may be applied. The two first examples are intended to show the results obtained by using, as a catalyst, either an azo-compound alone, or a mineral peroxide alone.

The results are much inferior to those obtained in the other examples using a mixture of the same catalysts according to the present invention.

Example 1

The following mixture is introduced in an autoclave:

|  | G. |
|---|---|
| Emulsifying solution | 390 |
| Vinyl chloride | 306 |
| Vinylidine chloride | 60 |
| Azo-diisobutyronitrile | 4 |

The mixture is then heated to 50° C. and maintained at that temperature. After 24 hours an unstable latex is obtained which, after flocculation and washing, produces a granular resin of a weight corresponding to a polymerization yield of about 63%.

Example 2

The following mixture is introduced in the autoclave:

|  | G. |
|---|---|
| Emulsifying solution | 390 |
| Vinyl chloride | 306 |
| Vinylidine chloride | 60 |
| Ammonium persulfate | 4 |

The temperature is maintained at 50° C. After 24 hours the polymerization yield is only about 50%.

Example 3

The following mixture is treated in the same temperature conditions as in the preceding examples:

|  | G. |
|---|---|
| Emulsifying solution | 390 |
| Vinyl chloride | 306 |
| Vinylidine chloride | 60 |
| Ammonium persulfate | 2 |
| Azo-diisobutyronitrile | 2 |

A stable latex is obtained which after flocculation gives a finely powdered copolymer. The yield of the copolymerization is 100% after 18 hours.

Example 4

The following mixture is treated as above:

|  | G. |
|---|---|
| Emulsifying solution | 15,000 |
| Vinyl chloride | 12,200 |
| Vinylidine chloride | 2,400 |
| Ammonium persulfate | 16 |
| Azo-diisobutyronitrile | 16 |

The temperature is maintained at 50° C. A 100% yield is obtained after 11 hours of copolymerization. It should be noted that, although the reaction is exothermal, the processing is easily controlled. The reaction does not run out of control.

Example 5

The following mixture is introduced in the autoclave:

|  | G. |
|---|---|
| Emulsifying solution | 390 |
| Vinyl chloride | 306 |
| Vinylidine chloride | 60 |
| Potassium persulfate | 2 |
| Azo-bis(phenylpropionitrile) | 2 |

A temperature of 45° C. is maintained during all the polymerization process. After 20 hours, a very stable latex is obtained which, after flocculation and washing, gives a homogeneous and very fine copolymer with a polymerization yield of 96%.

What is claimed is:

1. A process of producing copolymers of vinyl chloride and vinylidine chloride which comprises forming an aqueous emulsion of vinyl chloride, vinylidine chloride, and a plurality of catalysts, one said catalyst being an azo polymerization catalyst and another said catalyst an inorganic peroxide catalyst.

2. The process of manufacturing copolymers of vinyl chloride and vinylidine chloride which comprises forming an aqueous emulsion containing of the mixed monomers 10–30% of vinylidine chloride and 90–70% respectively of vinyl chloride, including in said emulsion a plurality of catalysts of which one is an azo polymerization catalyst and another is an inorganic peroxide catalyst, and polymerizing the mass with moderate and sustained heat in confinement.

3. A process of producing copolymers of vinyl chloride and vinylidine chloride which comprises forming an aqueous emulsion of vinyl chloride and vinylidine chloride in admixture with at least two polymerization catalysts, one of which is an azo polymerization catalyst and the other is an inorganic peroxide catalyst, and subjecting the emulsion to polymerizing conditions.

4. The process of claim 3 in which the emulsion is subjected to polymerization at a temperature of about 40–50° C.

5. A process according to claim 3 in which the azo polymerization catalyst is azo-diisobutyronitrile.

6. A process according to claim 3 in which the azo polymerization catalyst is azo-bis(phenylpropionitrile).

7. A process according to claim 3 in which the inorganic peroxide catalyst is one of a group consisting of the alkali per-salts and hydrogen peroxide.

8. The process of claim 3 in which the catalysts are ammonium persulfate and azo-diisobutyronitrile.

9. The process of claim 3 in which the catalysts are used in a mixture containing about equal parts of each.

References Cited in the file of this patent

UNITED STATES PATENTS

| 2,245,742 | Alexander et al. | June 17, 1941 |
| 2,471,959 | Hunt | May 31, 1949 |
| 2,480,752 | Rogers | Aug. 30, 1949 |

FOREIGN PATENTS

| 477,532 | Great Britain | Jan. 3, 1938 |
| 746,969 | France | Mar. 21, 1933 |
| 881,997 | France | Feb. 8, 1943 |

OTHER REFERENCES

Starkweather et al.: Ind. and Eng. Chem., vol. 39, No. 2, 1947, pages 210 and 211.

Fryling: Ind. and Eng. Chem. Analytical Ed., vol. 16, No. 1, 1944, page 1.